US006870852B1

(12) United States Patent
Lawitzke

(10) Patent No.: US 6,870,852 B1
(45) Date of Patent: Mar. 22, 2005

(54) COMBINATION ROUTER BRIDGE IN AN INTEGRATED SERVICES HUB

(75) Inventor: John H. Lawitzke, Bellevue, MI (US)

(73) Assignee: Sprint Communications Company L.P., Overland Park, KS (US)

( * ) Notice: Subject to any disclaimer, the term of this patent is extended or adjusted under 35 U.S.C. 154(b) by 679 days.

(21) Appl. No.: 09/751,778

(22) Filed: Dec. 29, 2000

(51) Int. Cl.⁷ .............................................. H04L 12/28
(52) U.S. Cl. ..................................... 370/401; 370/351
(58) Field of Search ................................ 370/230, 254, 370/351–356, 389, 390, 392–393, 400–402, 409, 419, 428–429, 469, 471, 473, 475

(56) References Cited

U.S. PATENT DOCUMENTS

| | | | |
|---|---|---|---|
| 5,881,142 A | 3/1999 | Frankel et al. ............... | 379/167 |
| 5,963,620 A | 10/1999 | Frankel et al. ............ | 379/93.05 |
| 6,023,563 A | * 2/2000 | Shani ......................... | 709/249 |
| 6,075,784 A | 6/2000 | Frankel et al. ............... | 370/356 |
| 6,141,339 A | 10/2000 | Kaplan et al. .............. | 370/352 |
| 6,381,218 B1 | * 4/2002 | McIntyre et al. ............ | 370/245 |

OTHER PUBLICATIONS

U.S. Appl. No. 09/197044, filed Nov. 20, 1998, Way et al.
U.S. Appl. No. 09/226575, filed Jan. 7, 1999, Rush et al.
U.S. Appl. No. 09/650,985, filed Aug. 30, 2000, Kaplan et al.
U.S. Appl. No. 09/650,560, filed Aug. 30, 2000, Kaplan et al.
U.S. Appl. No. 09/653,105, filed Aug. 31, 2000, Dale et al.
U.S. Appl. No. 09/675,585, filed Sep. 29, 2000, Goodrich.
U.S. Appl. No. 09/687,683, filed Oct. 12, 2000, Bayerl et al.
U.S. Appl. No. 09/689,365, filed Oct. 12, 2000, Goodrich.
U.S. Appl. No. 09/702,933, filed Oct. 31, 2000, Mahaney.
U.S. Appl. No. 09/711,113, filed Nov. 9, 2000, Goodrich et al.
U.S. Appl. No. 09/727,201, filed Nov. 30, 2000, Mahaney et al.
U.S. Appl. No. 09/745,919, filed Dec. 21, 2000, Bayerl et al.
U.S. Appl. No. 09/745,000, filed Dec. 21, 2000, Bayerl et al.
U.S. Appl. No. 09/747,907, filed Dec. 22, 2000, Barrow.
Author Unknown, *Address Resolution Protocol (arp)*, 2000, 1–2, www.erg.abdn.ac.uk/users/gorry/course/inet–pages/arp.html.

* cited by examiner

*Primary Examiner*—David Vincent

(57) ABSTRACT

The present invention discloses a method of automatically bridging or routing, i.e. internetworking, data packets received on an Ethernet port in a telecommunications integrated services hub. The target media access control, MAC, address of a data packet is compared to the MAC address assigned to the Ethernet port on which the data packet is received and to the broadcast MAC address. If the target MAC address matches the MAC address assigned to the Ethernet port on which the data packet is received, the data packet is treated with a routing protocol and sent to a wide area network controller for transmission to the Internet. If the target MAC address of the packet does not match the hub MAC address, the data packet is bridged to the appropriate LAN port of the hub. If the target MAC address matches the broadcast MAC address, the data packet is both routed to the Internet and bridged to all LAN ports.

12 Claims, 2 Drawing Sheets

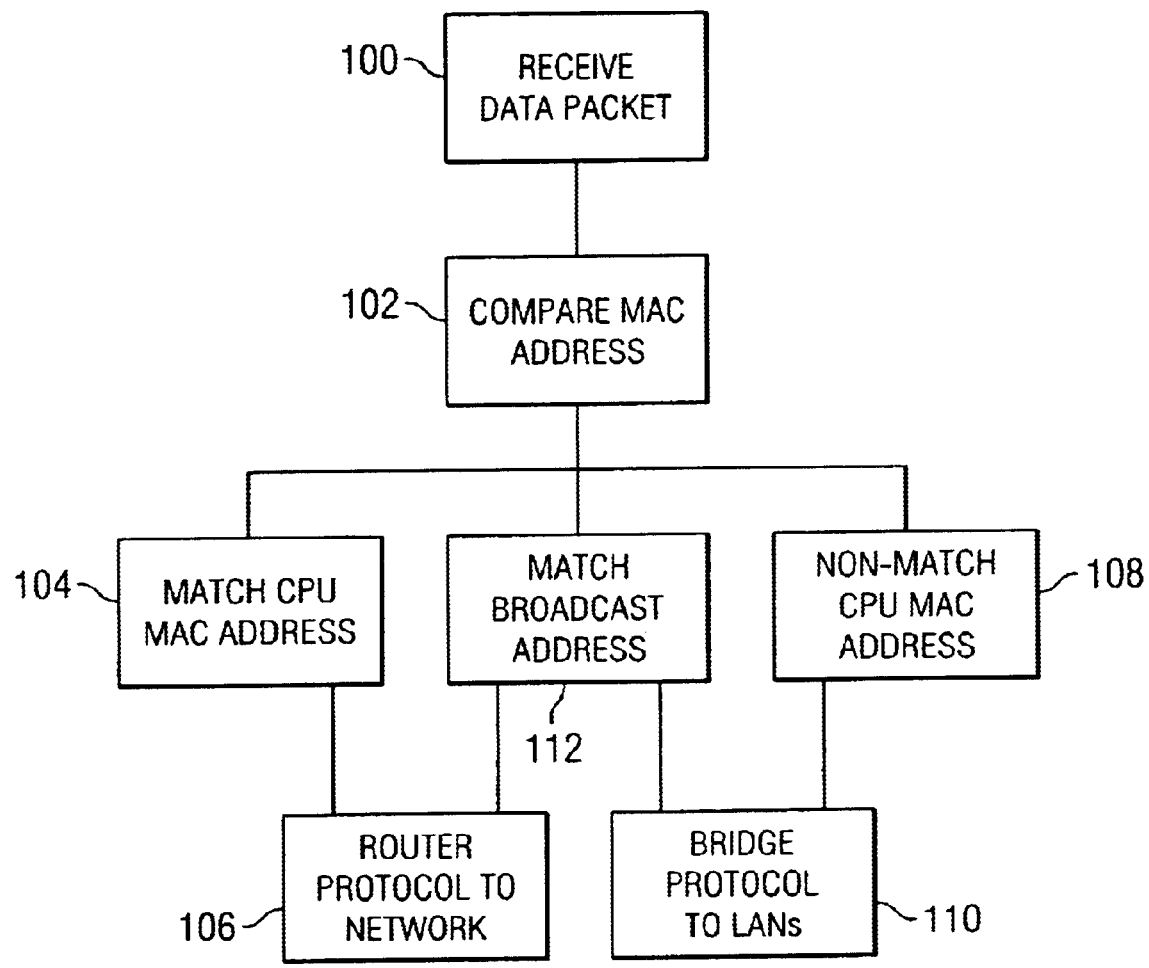

COMBINATION ROUTER BRIDGE IN AN INTEGRATED SERVICES HUB

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention relates to a method and apparatus for managing data originating on local area networks, and more particularly to a combined router and bridge which automatically routes or bridges data packets from local area networks to devices residing on the local area networks or through the internet to remote devices.

Traditionally, telephony communications within the United States were handled by the public switched telecommunications network (PSTN). The PSTN can be characterized as a network designed for voice communications, primarily on a circuit-switched basis, with full interconnection among individual networks. The PSTN network is largely analog at the local loop level, digital at the backbone level, and generally provisioned on a wireline, rather than a wireless, basis. The PSTN includes switches that route communications between end users. Circuit switches are the devices that establish connectivity between circuits through an internal switching matrix. Circuit switches set connections between circuits through the establishment of a talk path or transmission path. The connection and the associated bandwidth are provided temporarily, continuously, and exclusively for the duration of the session, or call. While developed to support voice communications, circuit switches can support any form of information transfer (e.g., data and video communications).

In a traditional PSTN environment, circuit switches include central office (CO) exchanges, tandem exchanges, access tandem exchanges, and international gateway facilities. Central offices, also known as exchanges, provide local access services to end users via local loop connections within a relatively small area of geography known as an exchange area. In other words, the CO provides the ability for a subscriber within that neighborhood to connect to another subscriber within that neighborhood. Central offices, also known as end offices, reside at the terminal ends of the network. In other words, COs are the first point of entry into the PSTN and the last point of exit. They are also known as class 5 offices, the lowest class in the switching hierarchy. A class 5 telephone switch communicates with an analog telephone using the analog telephony signals in the well-known analog format. The class 5 telephone switch provides power to the telephone; detects off-hook status of the telephone and provides a dial tone in response; detects dual-tone multi-frequency signals from the caller and initiates a call in the network; plays a ringback tone to the caller when the far-end telephone is ringing; plays a busy tone to the caller when the far-end telephone is busy; provides ring current to the telephone on incoming calls; and provides traditional telephone services such as call waiting, call forwarding, caller ID, etc.

In an effort to increase the amount and speed of information transmitted across networks, the telecommunications industry is shifting toward broadband packet networks which are designed to carry a variety of services such as voice, data, and video. For example, asynchronous transfer mode (ATM) networks have been developed to provide broadband transport and switching capability between local area networks (LANs) and wide area networks (WANs). The Sprint ION network is a broadband network that is capable of delivering a variety of services such as voice, data, and video to an end user at a residential or business location. The Sprint ION network has a wide area IP/ATM or ATM backbone that is connected to a plurality of local loops via multiplexors. Each local loop carries ATM over ADSL (asymmetric digital subscriber line) traffic to a plurality of integrated service hubs (ISHs), which may be at either residential or business locations.

An ISH is a hardware component that links business or residential user devices such as telephones and computers to the broadband, wide area network through a plurality of user interfaces and at least one network interface. A suitable ISH is described in U.S. Pat. No. 6,272,553 entitled "Multi-Services Communications Device," issued on Aug. 7, 2001, which is incorporated by reference herein in its entirety. The network interface typically is a broadband network interface such as ADSL, T1, or HDSL-2 Examples of user interfaces include telephone interfaces such as plain old telephone system (POTS) ports for connecting telephones, fax machines, modems, and the like to the ISH; computer interfaces such as Ethernet ports for connecting computers and local area networks to the ISH: and video ports such as RCA jacks for connecting video players, recorders, monitors, and the like to the ISH.

In providing telephony services over a broadband network, the ISH communicates with a service manager. This connection between the telephone and the network element is typically an ATM connection, which is much different than the traditional analog line to the local switch. ATM connections usually do not support analog telephony signals, such as off-hook, dial tone, and busy signals. Therefore, the ISH must provide many of the telephony functions traditionally provided by the telephone provider central office such as detect off-hook conditions, on-hook connections, and digits as well as provide the telephones with dial tone, ring voltage (sometimes referred to as ring current), ringback, and busy signals. The terms off-hook and off-hook condition as used herein are generic terms meaning that a user device (whether telephone, facsimile machine, modem, etc.) connected to a telephone line is attempting to access and use the line.

The ISH includes a processing core or central processing unit which controls these functions. It must exchange data with numerous peripheral devices within and external to the ISH itself. With increasing use of the Internet, an increasing amount of the data is in the form of Internet protocol, IP, data packets. These data packets may originate from personal computers connected to multiple Ethernet ports on the ISH or may be received over the network interface line, e.g. an ADSL line. The data from one PC may be addressed to another PC on one of the local area networks served by the Ethernet ports or may be addressed to an external internet site. Historically data packets have been exchanged between LANs by means of bridges or by bridging processes performed by a central processing unit. However, data packets which are to be sent from a device on a LAN to an Internet site have been sent by means of a router or a router process served by a central processing unit. The bridging and routing processes are different and not interchangeable. It is desirable to provide both functions in an ISH, but it is not practical to require residential or business end users to select devices or functions.

BRIEF SUMMARY OF THE INVENTION

The present invention provides a method for operating an integrated services hub so that it automatically internetworks data packets as a bridge or as a router. The ISH is assigned at least one media access control, MAC, address. All data packets received on any Ethernet port are received and the MAC address of each packet is examined. If the MAC address is the broadcast address, the packet is both bridged to the Ethernet ports and routed to the Internet port. If the packet has a single station MAC address which matches an ISH MAC address, then the packet is routed only to the Internet port. If the packet has a single station MAC address which does not match an ISH MAC address, then the packet is bridged only to the appropriate Ethernet ports of the ISH.

DETAILED DESCRIPTION OF THE INVENTION

Figure 1:
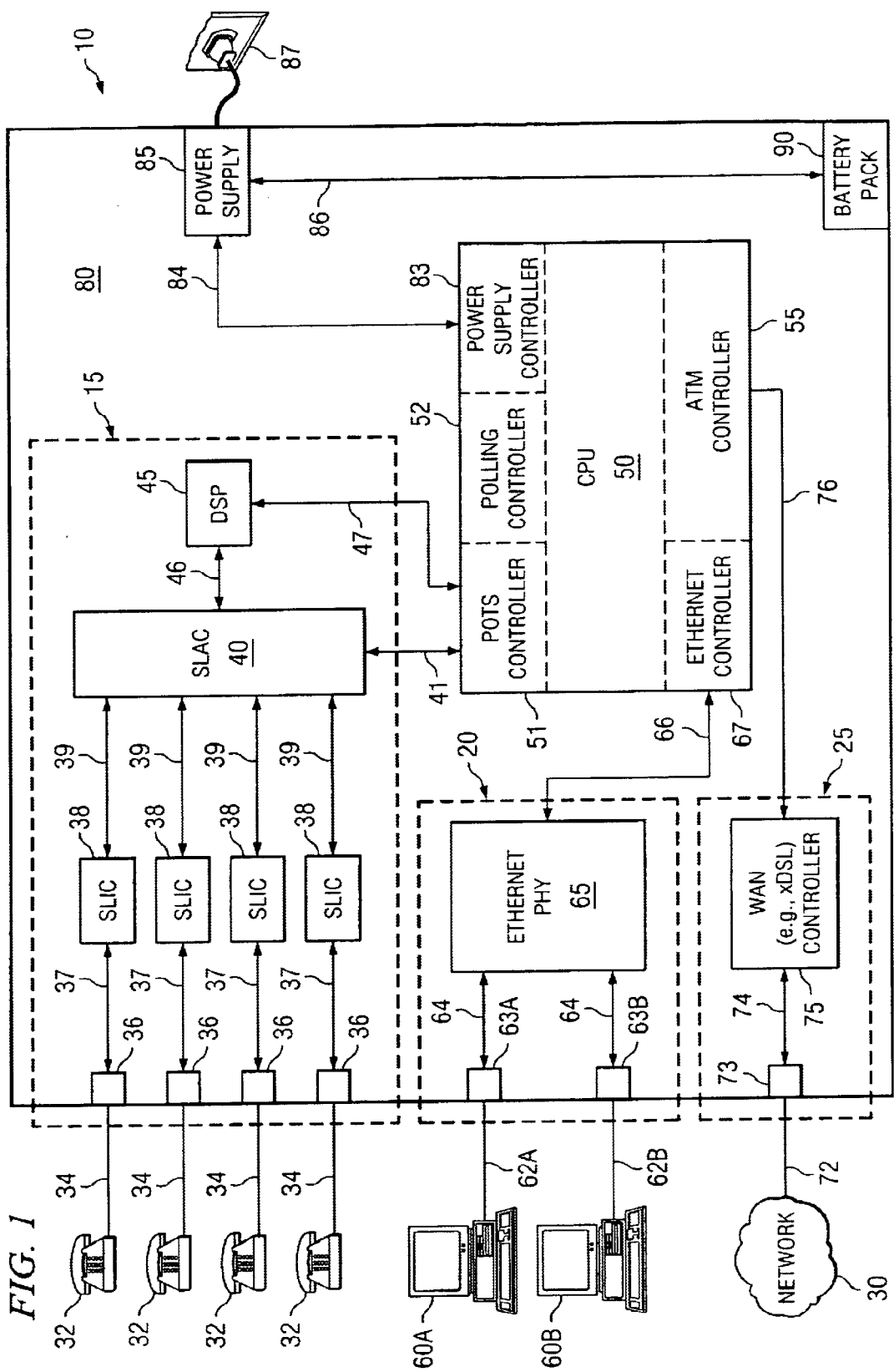
FIG. 1 is a block diagram of an integrated services hub, ISH, according to the present invention; and, FIG. 2 is a flow chart illustrating the automatic selection of bridging and/or routing functions according to the present invention.

Referring to FIG. 1, integrated services hub (ISH) 10 comprises plain old telephone system (POTS) interface 15, local area network (LAN) interface 20, and wide area network (WAN) interface 25. POTS interface 15 and LAN interface 20 provide user interfaces for the ISH. WAN interface 25 provides the ISH with an interface to a wide area network 30, preferably a broadband packet network such as Sprint's ION network. In describing the ISH, the components are generally described in carrying out the appropriate function to transmit data from the user interfaces to the WAN, and it should be understood that these components in general perform the reverse function when receiving data from the WAN and transmitting it to the user interfaces.

Telephones 32 are connected by telephone lines 34 to POTS interface 15 by telephone jacks 36, for example industry standard RJ-11 jacks. While four telephones are shown in FIG. 1, any desirable number of telephones may be employed provided that the equipment is appropriately sized to accommodate that number. Telephones 32 are conventional communications devices that typically use the analog telephony format, and similar devices may be substituted such as facsimile machines or modems. Digital format telephones could also be used, with the understanding that the specific circuitry involved would change while providing equivalent functions (for example, detecting hook transitions). Telephone lines 34 are any medium operational to carry telephony signals, and are typically twisted pairs of copper wires.

In addition to telephone jacks 36, POTS interface 15 further comprises subscriber line interface circuits (SLICs) 38, subscriber line access circuit (SLAC) 40, and digital signal processor (DSP) 45. SLICs 38 are connected to telephone jacks 36 by connections 37 on a one-to-one basis. In other words, each telephone connected to the ISH by a telephone jack has a separate and corresponding SLIC. Alternatively, SLICs may incorporate more than one channel each, that is to say a SLIC may be connected to more than one telephone line. The SLICs convert relatively high power, two-line analog signals (also referred to as a tip and ring phone circuit) received from the telephone into relatively low power, four-line analog signals (also referred to as a transmit signal circuit and a receive signal circuit). Furthermore, the SLIC serves as the amplifier that drives power (i.e., voltage and current) onto its corresponding telephone line. Examples of suitable SLICs are integrated circuit chip numbers AM79R79 and AM79R241 produced by Legerity, the former communications division of Advanced Micro Devices (AMD), Inc.

SLAC 40 is connected to SLICs 38 by connections 39. Generally, a SLAC performs three functions: line supervision, signal filtering and manipulation, and analog/digital conversions. The SLAC supervises the lines (and the SLIC corresponding to each line), which includes execution of various protocols for detecting and recognizing an off-hook condition. While a preferred embodiment shown in FIG. 1 uses a SLAC to perform line supervision, SLICs are available that perform line supervision functions, and such enhanced SLICs having integral hook transition monitoring capability could be used in carrying out the invention. Signal filtering and manipulation is used to conform signals to various industrial or regional/national telephony standards. The SLAC converts four-line analog signals received from the SLICs into four-line digital signals. Thus, the SLAC is an analog to digital (A/D) and digital to analog (D/A) converter, which is also referred to respectively as coding and decoding (i.e., a CODEC). Preferably, the SLAC codes and decodes in compliance with the International Telecommunications Union (ITU) G.711 standard. Typically, a SLAC manages a fixed number of SLICs, and thus the number of SLACs is determined by the number of SLICs. Examples of suitable SLACs are integrated circuit chip numbers AM79Q021 and AM79Q2243 produced by Advanced Micro Devices (AMD), Inc., which are a quad-devices designed to manage four SLICs.

SLAC 40 transmits and receives control data such as line status and signaling to the central processing unit (CPU) 50 by connection 41. The CPU controls the overall function of the ISH and has initialization, management, configuration, and control responsibilities for all of the components and interfaces comprising the ISH. CPU 50 contains control software, which is stored in memory (for example, flash memory), and the control software is executed by the CPU. Upon execution of the control software, the CPU interacts with various memory mapped peripherals (for example, WAN interface 25). The CPU control software include a) a POTS control module 51 that controls the telephony functions during operation of the ISH under primary power; b) a polling control module 52 that controls the POTS telephony functions when primary power fails; c) a power supply control module 83 which monitors, either continuously or periodically, the power supply; and d) ATM control module 55 that controls the communications with the network. An example of a suitable CPU is integrated circuit chip number MPC8260 Power QUICC II Communications Processor produced by Motorola, Inc.

Digital signal processor (DSP) 45 compresses (i.e., packetizes) data, typically voice data, received from SLAC 40 by connection 46. DSP 45 transmits compressed data to CPU 50 via connection 47 for transmission to network 30 by ATM control module 55. An example of a suitable DSP is integrated circuit chip number TMS320VC5402 produced by Texas Instruments, Inc. ATM control module 55 provides the ATM and ML (ATM adaptation layer) layers of the ATM Protocol, which are necessary for ATM-formatted communications with network 30. In a preferred embodiment, ATM control module 55 is a software module on CPU 50.

Computers 60, typically personal computers, are connected by connections 62 to LAN interface 20 by LAN connectors 63. LAN connectors 63 are preferably RJ-45 jacks, but any suitable computer connection means may be employed, for example a universal serial bus (USB). While two computers are shown in FIG. 1, any desirable number of computers may be employed provided that the equipment is appropriately sized to accommodate that number. LAN interface 20 further comprises a LAN physical layer (PHY) device 65 connected to LAN connectors 63 by connections 64. LAN PHY device 65 is preferably an Ethernet PHY, and more specifically a MII transceiver. CPU 50 contains an Ethernet control module 67, which serves as a media access control (MAC) device and is connected to LAN PHY device 65 by connection 66. The control module 67 provides a separate MAC address for each of the Ethernet ports 63 and manages the ports separately. The separate MAC addresses are needed for a number of reasons, including the fact that the controller 67 keeps track of the MAC addresses of the computers 60 residing on each LAN connected to the ports 63. The Ethernet PHY and MAC devices support a $10/100$ Mbit industry standard MII Ethernet connection.

Network 30 is connected by connection 72 to WAN interface 25 by WAN connector 73. WAN connector 73 is preferably a RJ-11 jack for ADSL. WAN interface 25 is preferably a universal, xDSL interface, and more preferably an ATM over ADSL interface. xDSL is a generic term encompassing all known varieties of digital subscriber lines (DSL) such as ADSL, U-ADSL, SDSL, HDSL-2, RADSL, etc. Other types of WAN interfaces could be used such as T1, cable modem, wireless broadband modem, or ATM-25.

WAN interface 25 further comprises WAN controller 75 connected to WAN connector 73 by connection 74. WAN controller 75 is connected to ATM control module 55 by connection 76. WAN controller 75 is preferably Globespan's G7000 multimode chip set, which further comprises an analog front end (AFE) chip (Globespan GS707X) and a multimode xDSL downloadable DSP and framer chip (Globespan GS707X). The AFE chip provides analog to digital and digital to analog signal conversions. The DSP and framer chip provides digital signal processing and signal transmission framing functions.

POTS interface 15, LAN interface 20, WAN interface 25, CPU 50, and ATM controller 55 are mounted on motherboard 80, which is a printed circuit board (also referred to as a logic board) that provides the various connections between ISH components as discussed above. The motherboard may include expansion slots to accept expansion cards such as an additional POTS card, an ATM-25 interface, a cable modem, etc. Motherboard 80 is connected to power supply 85 and battery pack 90, thereby providing power to the ISH components, the attached analog telephones, and the battery monitoring and charge circuitry. CPU 50 contains a power supply control module 83 connected to power supply 85 by connection 84. A preferred power supply is a universal-input (40–400 Hz, 90–270V AC RMS) switch mode lead/acid battery float charger with a current-limited output of nominally 13.8 V, and provides charging current to battery pack 90 as represented by connection 86. A preferred battery is a 12 volt DC, 2.5A gel cell (lead-acid) battery, and preferably battery pack 90 comprises two such batteries housed within the ISH.

The power supply is plugged into a standard electrical outlet 87 and serves as the primary power source for the ISH. In the event of a power failure to the electrical outlet, the ISH operates under backup power provided by its battery pack and basic telephone services remain available to the customer for emergency calls.

As illustrated, the ISH has two Ethernet ports 63, each receiving an Ethernet cable 62. Each cable 62 provides an interconnection for a local area network, LAN, to which a plurality of computers 60 may be connected. Each of the computers 60 can generate data packets for transmission to another computer 60 or to a remote device through network 30.

IP data packets being transmitted on a LAN have an addressing protocol to allow IP data packets to be transmitted to the appropriate device. Every interface device has a unique media access control, MAC, address assigned at the time of manufacture. Devices operating under Internet protocol also have an IP address, which may or may not be permanently assigned to the device. When a computer 60 transmits a data packet on the LAN, the packet includes the MAC address of the target, or destination, device, the MAC address of the sending device, the IP address of the target device and the IP address of the sending device, as well as the data payload.

Data packets from computers 60 are coupled by cables 62, ports 63 and cables 64 to the transceiver 65, which receives all of them and sends them to the Ethernet controller 67, which must send the data packet to the target device. While prior art devices are dedicated to provide either bridging or routing protocols to forward data packets, the controller of the present invention uses both protocols and automatically selects one or both protocol(s).

In bridging protocol, a physical bridging device or bridging software is used to connect two or more LANs together. The ISH is a typical application for use of a bridge to connect LANs. The two Ethernet ports 63 are physically in the same location and are connected to computers 60 which are in close proximity, for example, in the same residence. For example, if computer 60A wants to send a data packet to computer 60B, the data packet from computer 60A would have the MAC address of computer 60B. As noted above, IP data packets also include the MAC address of the sending device. A bridge records the MAC addresses of messages which it receives and thereby builds a table of devices connected to each port. When the packet is received on port 63A from computer 60A the bridge function requires that the bridge recognize that the target device is connected to port 60B and forward the data packet to port 60B.

If any computer 60 wants to send a data packet to a remote device through network 30, a router function is required. In router protocol, the sending device is set up with the MAC address of a gateway or router, to which it knows it must address data packets being sent to the Internet or other wide area network, WAN. In this case the IP data packet would have the MAC address of the router as the target device, but the IP address would be for the remote target device. The router address for computer 60A is the MAC address assigned to Ethernet port 63A. The router address for computer 60B is the MAC address assigned to Ethernet port 63B. The function of the router is to receive the data packet, and resend it through WAN controller 75 to the Internet. When the router resends the data packet, it removes the MAC addresses and sends the packet with only the IP addresses of the target device and the sending device.

Since the bridging function and routing function are different, the Ethernet controller 67 in CPU 50 must have a process for determining which function it should perform.

At process is shown in FIG. 2. The first step 100 of the process is to receive the data packets from computers 60. Transceiver 65 receives all of data packets sent by the computers 60 and transmits them over line 66 to the Ethernet controller 67. The controller 67 then stores the sending device MAC address and compares the target MAC address to the controller or CPU MAC addresses assigned to the ports 63 and to the broadcast address.

If, as indicated at step 104, the target MAC address is the same as either of the MAC addresses assigned by the CPU to ports 63, then the data packet is treated with the router protocol at step 106. At step 106, the MAC addresses are removed and the data packet is sent to WAN controller 75 for transmission over network 30.

If, as indicated at step 108, the data packet MAC address does not match either of the MAC addresses assigned to ports 63, then the data packet is sent to the bridge protocol step 110. In this step, the data packet is sent in its original form back to one or both of Ethernet ports 63. The computer 60 sending the data packet would know to use the MAC address of its Ethernet port if it wanted the data packet routed over the network 30. Any other MAC address indicates that the target device is connected to one of the LANs 62. If controller 67 has not at that point in time stored the target MAC address, it sends the data packet to both of the Ethernet lines 62. If it has stored the target MAC address, it sends the packet only to the appropriate line 62A or 62B. However, if the data packet was received on the same line to which the target device is connected, the controller will not send the packet, since the target device will have already received the data packet.

If, as indicated at step 112, the MAC address is the broadcast MAC address, the data packet is sent to both the router process 106 and to the bridge process 110. The broadcast MAC address is an address containing only logic ones and indicates that the message is intended to be sent to all devices, typically as part of the address resolution protocol. In the bridge process 110, all data packets with the broadcast MAC address will be sent to both Ethernet lines 62, to ensure that all computers connected to both LANs receive the broadcast message. In the router process 106, the broadcast message is sent to the Internet for broadcast to all connected devices.

While the present invention has been illustrated and described with reference to particular equipment and methods of operation, it is apparent that various changes and substitution of equivalent parts can be made within the scope of the present invention as defined by the appended claims.

I claim:

1. A method for managing data packets received on a plurality of Ethernet ports in a telecommunications integrated services hub having a wide area network interface to the Internet, comprising:

receiving a data packet at a first Ethernet port, comparing the media access control target address in the data packet to a) media access control addresses assigned to the first Ethernet port, and b) the broadcast MAC address, if the media access control target address in the data packet patches the media access control address of the first Ethernet port, using a routing protocol to forward the data packet to the wide area network interface to the Internet, if the media access control target address in the data packet does not match the media access control address of the fist Ethernet port, using a bridging protocol to forward the data packet to one or more of the Ethernet ports, and if the media access control address in the data packet matches the broadcast MAC address, using a bridging protocol to forward the data packet to all of the Ethernet ports and using a routing protocol to forward the data packet to the wide area network interface to the Internet.

2. The method of claim 1 wherein each Ethernet port comprises a local area network having one or more personal computers.

3. The method of claim 1 wherein said data packets are Internet protocol date packets.

4. A telecommunications integrated services hub comprising:

a plurality of Ethernet ports for receiving Internet protocol data packets, each port having an assigned media access control address, a wide area network interface to the Internet, a central processor having bridging software for bridging data packets between Ethernet ports and routing software for routing data packets to the wide area network interface, means for comparing the target media access control address contained In a data packet to the media access control address assigned to the Ethernet port on which the data packet is received and to the broadcast address and (a) if the data packet target media access control address does not match the media access control address assigned to the Ethernet port on which the data packet is received, processing the data packet with the bridging software, (b) if the target media access control address matches the media access control address assigned to the Ethernet port on which the data packet is received, processing the data packet with the routing software, and (c) if the target media access control address matches the broadcast address, processing the data packet with both the bridging software and the routing software.

5. The apparatus of claim 4 wherein each Ethernet port comprises a local area network having one or more personal computers.

6. The apparatus of claim 4 wherein said data packets are Internet protocol data packets.

7. A telecommunications integrated services hub comprising:

a plurality of Ethernet ports for receiving Internet protocol data packets, a wide area network interface to the Internet, bridging means for bridging data packets between Ethernet ports, routing means for routing data packets to the wide area network interface, selection means for receiving a data packet and automatically selecting one or both of said bridging means and said routing means based on content of said data packet.

8. The apparatus of claim 7, wherein said selection means bases selection of said bridging means and said routing means on the target media access control address contained in said data packet.

9. The apparatus of claim 8 wherein;

each Ethernet port has a media access control address, said selection means compares the target media access address to the media access address assigned to the Ethernet port on which the data packet is received and to the broadcast media access address.

10. The apparatus of claim 9 wherein said selection means selects said bridging means if said target media access control address does not match said media access address assigned to the Ethernet port on which the data packet is received.

11. The apparatus of claim 9 wherein said selection means selects said routing means if said target media access control address matches said media access address assigned to the Ethernet port on which the data packet is received.

12. The apparatus of claim 9 wherein said selection means selects both said bridging means and said routing means if said target media access control address matches said broadcast address.

* * * * *